United States Patent [19]
Hamilton

[11] Patent Number: 5,421,069
[45] Date of Patent: Jun. 6, 1995

[54] SELF-LOCKING STRAP MECHANISM
[76] Inventor: James Hamilton, 30670 Moffat Ave., Steamboat Springs, Colo. 80487
[21] Appl. No.: 168,086
[22] Filed: Dec. 15, 1993
[51] Int. Cl.⁶ .................. A44B 11/00; F16G 11/00
[52] U.S. Cl. ................... 24/300; 24/115 G; 24/134 R
[58] Field of Search ............. 24/300, 134 KA, 134 R, 24/136 R, 115 G; 160/178.2; 403/211

[56] References Cited

U.S. PATENT DOCUMENTS

| | | | |
|---|---|---|---|
| 682,869 | 9/1901 | Hammerly | 24/134 R |
| 1,961,081 | 5/1934 | Schrader | 24/134 R |
| 2,442,266 | 5/1948 | Davis | 24/134 R |
| 2,531,835 | 11/1950 | Anderson | 24/115 G |
| 2,890,510 | 6/1959 | Spalding | 403/211 |
| 3,362,201 | 1/1968 | Lachin | 24/115 G |
| 3,524,229 | 8/1970 | Mindt | 24/132 |
| 3,644,966 | 2/1972 | Higgins | 24/134 QA |
| 3,806,996 | 4/1974 | Farrow | 24/134 R |
| 3,897,161 | 7/1975 | Reinwall, Jr. | 403/211 |
| 4,680,835 | 7/1987 | Horng | 24/136 R |
| 4,878,269 | 11/1989 | Anscher et al. | 24/115 G |

Primary Examiner—Victor N. Sakran
Attorney, Agent, or Firm—John R. Flanagan

[57] ABSTRACT

A self-locking strap mechanism includes inner and outer hollow tubes each having a pair of spaced holes and a separate actuator aperture defined therethrough. The outer hollow tube is inserted over the inner hollow tube. The strap mechanism also includes a length of flexible strap. The length of strap is routed through the holes of the inner and outer hollow tubes. The inner and outer hollow tubes are longitudinally movable relative to one another between locked and released positions wherein the respective holes are aligned and misaligned with one another such that portions of the inner and outer hollow tubes frictional grip and release the length of strap routed therethrough.

18 Claims, 1 Drawing Sheet

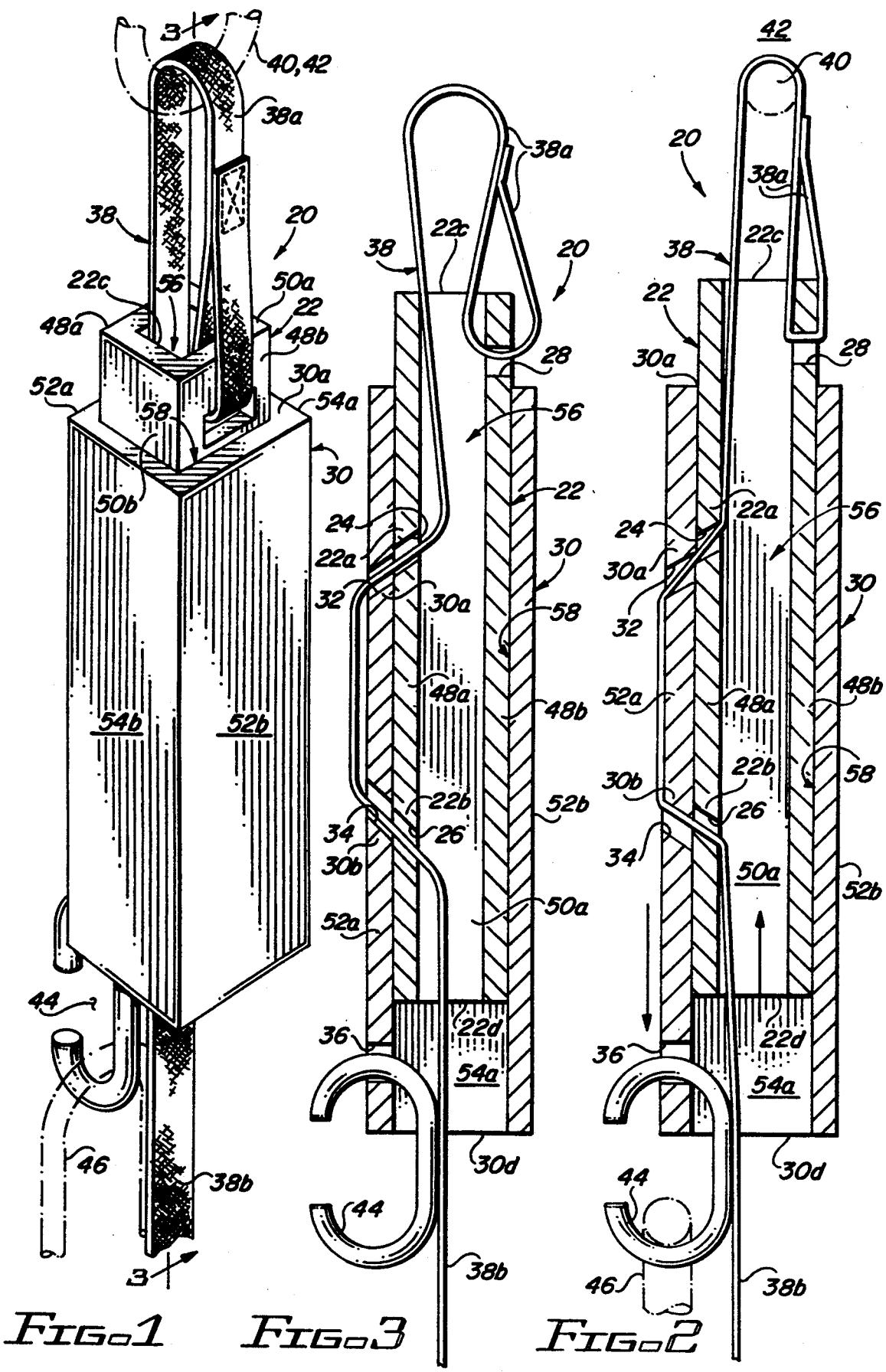

SELF-LOCKING STRAP MECHANISM

BACKGROUND OF THE INVENTION

1. Field of the Invention

The present invention generally relates to locking assemblies for ropes, straps and the like and, more particularly, is concerned with a self-locking strap mechanism.

2. Description of the Prior Art

A varied assortment of locking assemblies have been proposed over the years for securing filaments such as ropes, cords and various types of strapping material over sailing and camping equipment and the like, as well as for such areas of use as clotheslines, laundry bags, clothing hoods, and so on. Representative examples of such assemblies are discloses in U.S. Pat. Nos. to Mindt (3,524,229), Higgins (3,644,966), Farrow (3,806,996) and Reinwall, Jr. (3,897,161).

Each of these locking assemblies has features for gripping and releasing ropes and other filaments for a variety of areas of use. The Farrow and Reinwall, Jr. assemblies are each rather complicated in design and construction and thus fairly costly to manufacture. The Mindt and Higgins assemblies, although simple in design and construction, are essentially designed for limited types of use. The Mindt assembly is utilized basically for maintaining a rope about an object without tying any knots therein. The Higgins assembly is utilized basically as a clamping device for securing mooring lines, tent stabilizing lines, clotheslines and the like to a base point.

None of the assemblies provide features for suspending objects such as greenhouse lamps or electric and air tools from a stationary point on a support structure, such as a ceiling. Additionally, none of the assemblies provide quick releasing and locking capabilities for efficient height adjustment of the suspended object.

Consequently, a need still exists for a self-locking strap mechanism of simple design and construction capable of inexpensive manufacture and ease in use by the average person.

SUMMARY OF THE INVENTION

The present invention provides a self-locking strap mechanism designed to satisfy the aforementioned need by avoiding the drawbacks of the prior art without introducing other drawbacks. Instead, the strap mechanism of the present invention provides expanded capabilities not available in the prior art devices.

One capability is the simplicity in design and construction of the strap mechanism permitting inexpensive manufacture and ease of use by the average person. A second capability is the actuator hook feature of the strap mechanism for suspending objects of weight such as greenhouse lamps or electric and air tools from a stationary point on a support station such as a ceiling. A third capability is the simple and speedy locking and releasing features of the strap mechanism for efficient use thereof and for ease in height adjustment of a suspended object.

Accordingly, the present invention is directed to a self-locking strap mechanism which comprises: (a) an elongated inner hollow tube having first means defined therethrough for receiving a length of strap; and (b) an elongated outer hollow tube having second means defined therethrough for receiving the length of strap, the outer hollow tube being inserted over the inner tube, the inner and outer hollow tubes being longitudinally movable relative to one another between locked and released positions wherein the first and second strap-receiving means are respectively aligned and misaligned with one another for frictionally gripping and releasing the length of strap routed therethrough.

The first strap-receiving means includes a pair of holes defined through a side portion of the inner hollow tube and spaced longitudinally from one another. The second strap-receiving means includes a pair of holes defined through a side portion of the outer hollow tube and spaced longitudinally from one another. The side portions of the inner and outer hollow tubes are located adjacent to one another and the respective pairs of longitudinally-spaced holes are located adjacent to one another. The pairs of longitudinally-spaced holes are alignable and misalignable with one another as the inner and outer tubes are longitudinally moved relative to one another between the locked and released positions such that portions of the tubes defining the holes frictionally grip and release the length of strap routed through the holes.

The present invention is also directed to a self-locking strap mechanism which comprises: (a) a length of flexible strap; (b) an elongated inner hollow tube having a first pair of holes defined through a side portion thereof and being spaced longitudinally from one another and receiving the length of flexible strap; and (c) an elongated outer hollow tube having a second pair of holes defined through a side portion thereof and being spaced longitudinally from one another and receiving the length of flexible strap, the outer hollow tube being inserted over the inner hollow tube, the inner and outer hollow tubes being longitudinally movable relative to one another between locked and released positions wherein the first and second pairs of holes are respectively aligned and misaligned with one another such that portions of the tubes defining the holes will frictionally grip and release the length of strap routed through the holes. The inner and outer hollow tubes have respective rectangular cross-sectional configurations. The strap mechanism also includes an actuator aperture defined through an upper portion of the inner hollow tube and another actuator aperture defined through a lower portion of the outer hollow tube. The flexible strap is further routed through the actuator aperture in the upper portion of the inner hollow tube and looped back upon and attached to itself such that the flexible strap is deployable from a stationary point located above the strap mechanism.

Further, the inner tube has pairs of opposite side walls connected with one another along longitudinal edges thereof to define a longitudinal rectangular configuration. The holes in the inner hollow tube are defined through one side wall of the inner hollow tube and spaced longitudinally from one another. The outer tube has pairs of opposite side walls connected with one another along longitudinal edges thereof to define a longitudinal rectangular configuration. The holes in the outer hollow tube are defined through one side wall of the outer hollow tube and spaced longitudinally from one another.

The strap mechanism is locked onto the strap by exerting simultaneous pressure in opposite directions on the inner and outer tubes. In hanging an object of given weight, such as a greenhouse lamp, the weight of the object pulls the outer tube downwardly away from the inner tube such that the respective pairs of holes spaced thereon become misaligned with one another so as to lock the strap mechanism into place on the strap. The strap mechanism is released from its locked position on the strap by a user exerting simultaneous hand pressure on the inner and outer tubes towards one another so as to re-align the respective pairs of holes with one another. Upon such release, the strap mechanism is movable either upwardly or downwardly on the strap for attaining proper length adjustment of the suspended greenhouse lamp. The strap mechanism can then be re-locked as hereinbefore described.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a self-locking strap mechanism of the present invention being shown fully deployed.

FIG. 2 is a longitudinal sectional view of the strap mechanism taken along line 2—2 of FIG. 1, showing the inner and outer tubes in a locked position relative to one another.

FIG. 3 is a view of the strap mechanism similar to that of FIG. 2, but showing the inner and outer tubes in a released position relative to one another.

DETAILED DESCRIPTION OF THE INVENTION

Referring to the drawings and particularly to FIGS. 1 and 2, there is illustrated a self-locking strap mechanism of the present invention, being generally designated 20. In its basic components, the strap mechanism 20 includes an inner hollow tube 22 having a pair of longitudinally spaced upper and lower holes 24, 26 and a separate upper end actuator aperture 28 defined therethrough. The strap mechanism 20 also includes an outer hollow tube 30 similarly having a pair of longitudinally spaced upper and lower holes 32, 34 and a separate lower end actuator aperture 36 defined therethrough. The outer tube 30 is enough greater in cross-sectional dimensions than the inner tube 22 so as to be snugly fittable thereover and slidable relative thereto. Thus, the outer hollow tube 30 is inserted over the inner hollow tube 22 such that tubes are longitudinally movable relative to one another between locked and released positions, as seen respectively in FIGS. 2 and 3, wherein the respective upper and lower pairs of holes 24, 32 and 26, 34 are aligned and misaligned with one another such that portions 22a, 30a and 22b, 30b of the inner and outer tubes 22, 30 defining the upper and lower pairs of holes 24, 32 and 26, 34 respectively frictionally grip and release a length of strap 38 routed therethrough.

The strap mechanism 20 further includes the flexible strap 38 routed through the inner and outer hollow tubes 22, 30 and the respective upper and lower pairs of holes 24, 32 and 26, 34 thereof. The flexible strap 38 has a suitable predetermined length and is made of a suitable material, preferably an inelastic material. The strap 38 is routed through the strap mechanism 20 so as to be deployable from a stationary point 40 located on a support station 42. An actuator hook 44 is deployable from the lower end actuator aperture 36 defined through a lower portion of the outer hollow tube 30 for supporting an object of a given weight 46 to be hung therefrom, such as a greenhouse lamp.

More particularly, referring to FIGS. 2 and 3, the inner and outer hollow tubes 22, 30 are each elongated, rigid sleeves of rectangular configurations, formed by pairs of opposite side walls 48a, 48b, 50a, 50b and 52a, 52b, 54a, 54b being attached together along their respective longitudinal side edges. Each side wall has opposed planar inside and outside surfaces. The inner and outer hollow tubes 22, 30 each extend between a pair of opposite upper and lower open ends 22c, 22d and 30c, 30d. Also, each of the inner and outer hollow tubes 22, 30 have a central passageway 56, 58 extending between the opposite open ends of the tube. The tubes 22, 30 are made of a suitable durable, resilient material, such as steel, aluminum, thermoplastic or wood.

Furthermore, the pair of longitudinally spaced holes 24, 26 of the inner hollow tube 22 are defined through the same one side wall 48a thereof. The upper end actuator aperture 26 is defined through an upper portion of the side wall 48b opposite to the one side wall 48a near the upper open end 22c thereof. Similarly, the pair of longitudinally spaced holes 32, 34 of the outer hollow tube 30 are defined through the same one side wall 52a thereof. The lower end actuator aperture 36 is defined through a lower portion of the same side wall 52a near the lower open end 30d thereof. The side walls 48a, 52a of the respective inner and outer hollow tubes 22, 30 are disposed adjacent to one another such that the pairs of longitudinally-spaced holes 24, 26 and 32, 34 therethrough are also located adjacent to one another.

The flexible strap 38 of the mechanism 20 has a pair of opposite ends 38a, 38b and is routed at the one end 38a through the upper end 22c of the inner hollow tube 22 and the upper end actuator aperture 28 defined through the side wall 48b thereof. The upper end 38a of the strap 38 is then folded back upon and re-attached to itself by stitching at a portion thereof adjacent to the upper end 38a of the strap 38.

From its upper end 38a, the strap 38 is looped over the stationary support point 40 and then routed downwardly through the upper open end 22c of the inner hollow tube 22 into the central passageway 56 thereof and through the upper holes 24, 32 defined through the inner and outer hollow tubes 22, 30 so as to emerge outside the strap mechanism 20, running along the outer surface of the one side wall 52a of the outer tube 30. The strap 38 is then routed through the lower holes 34, 26 of the respective outer and inner hollow tubes 30, 22 and into the central passageway 56 of the inner hollow tube 22 so as to extend downwardly therefrom through the lower open ends 22d, 30d of the respective inner and outer hollow tubes 22, 30, as seen in FIGS. 2 and 3, to a lower end 38b of the strap 38.

Referring further particularly to FIGS. 2 and 3, the inner and outer hollow tubes 22, 30, having the strap 38 routed therethrough as aforedescribed, are thereby axially or longitudinally movable relative to one another between locked and released positions, as seen in FIGS. 2 and 3, wherein the respective pairs of spaced holes 24, 26 and 32, 34, defined through the inner and outer tubes 22, 30, are aligned and misaligned with one another such that the portions 22a, 30a and 22b, 30b defining the upper and lower pairs of holes 24, 32, 26, 34 will corresponding frictionally grip and release the length of strap 38 routed therethrough. When the respective upper and lower pairs of holes 24, 32 and 26, 34 are aligned with one another, as seen in FIG. 3, the strap mechanism 20 can be moved freely either upwardly or downwardly on the strap 38. The strap mechanism 20 can be securely locked into position at a location on the strap 38 by exerting hand pressure, simultaneously, upwardly on the inner hollow tube 22 and downwardly on the outer hollow tube 30 such that the pairs of upper holes 24, 32 and 26, 34 defined through the respective inner and outer hollow tubes become misaligned with one another, as seen in FIG. 2.

Referring further to FIGS. 1-3, the strap mechanism 20 is utilized in the following manner. The strap 38, being previously routed through the inner and outer hollow tubes 22, 30 as hereinbfore described, is deployed at a location near the one end 38a thereof about a stationary point 40 located on a support station 42 such that the strap 38 and tubes 22, 30 of the strap mechanism 20 depend therefrom, as seen in FIGS. 1 and 2. An actuator hook 44 is deployed from the lower end actuator aperture 36 defined through the lower portion of the one side wall 52a of the outer hollow tube 30. An object 46 of given weight, such as a greenhouse lamp, may then be hung from the actuator hook 44 for focusing on a group of plants, as desired. The weight of the lamp 46 pulls the outer tube 30 downwardly, thereby maintaining the misalignment of the pairs of holes 24, 26 and 32, 34 defined through the inner and outer tubes 22, 30.

Consequently, the inner and outer hollow tubes 22, 30 of the strap mechanism 20 are thereby maintained in the locked position on the strap 38 as well, as seen in FIG. 2. The particular height of the lamp 46 from the plants may be adjusted accordingly by releasing the inner and outer hollow tubes 22, 30 of the strap mechanism 20 from their locked position on the strap 38 for either upward or downward movement thereon until a suitable lamp height is reached. As hereinbefore described, the strap mechanism 20 is released from the locked position by aligning the pairs of spaced holes 24, 26 defined through the inner and outer hollow tubes 22, 30 with one another. Such alignment is achieved by exerting simultaneous hand pressure on the inner and outer hollow tubes 22, 30 towards one another. Upon reaching a suitable lamp height, the inner and outer hollow tubes 22, 30 are re-locked on the strap 38 as described hereinbefore.

The above-described use of the strap mechanism 20 with greenhouse lamps 46 provides an efficient, low cost method for achieving proper lighting effects therewith. The strap mechanism 20 could be adapted for a plurality of other uses. One such use would provide a low cost method for suspending electric and air tools from the ceilings of production facilities. A further use would provide a low cost method for fastening cargo nets to the ceilings of cargo ships and the like. A miniature version of the strap mechanism 20 could provide an efficient method for fastening tennis shoes.

To summarize, the strap mechanism 20 provides features for suspending an object of given weight such as a greenhouse lamp, or air and electric tools from a stationary point on a support station, such as ceiling. The strap mechanism 20 further provides quick releasing and locking features for efficient adjustment of a pair of tubes on a strap of the mechanism 20 for effective height adjustment of the suspended object.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

I claim:

1. A self-locking strap mechanism, comprising:
   (a) an elongated inner hollow tube having first means defined therethrough for receiving a length of strap; and
   (b) an elongated outer hollow tube having second means defined therethrough for receiving the length of strap, said outer hollow tube being inserted over said inner hollow tube, said inner and outer hollow tubes being longitudinally movable relative to one another between locked and released positions wherein said first and second strap-receiving means are respectively aligned and misaligned with one another for frictionally gripping and releasing the length of strap routed therethrough;
   (c) said first strap-receiving means including a pair of holes defined through a side portion of said inner hollow tube and spaced longitudinally from one another, said second strap-receiving means including a pair of holes defined through a side portion of said outer hollow tube and spaced longitudinally from one another, said side portions of said inner and outer hollow tubes being located adjacent to one another such that said pairs of longitudinally-spaced holes are located adjacent to one another;
   (d) said pairs of longitudinally spade holes being alignable and misalignable with one another as said inner and outer hollow tubes are longitudinally moved relative to one another between said locked and released positions such that portions of said inner and outer hollow tubes defining said holes frictionally grip and release the length of strap routed therethrough.

2. The strap mechanism of claim 1 wherein said inner and outer hollow tubes have respective rectangular cross-sectional configurations.

3. The strap mechanism of claim 1 wherein said inner hollow tube has pairs of opposite side walls connected with one another along longitudinal edges thereof to define a longitudinal rectangular configuration.

4. The strap mechanism of claim 3 wherein said first strap-receiving means includes a pair of holes defined through one side wall of said inner hollow tube and spaced longitudinally from one another.

5. The strap mechanism of claim 4 wherein said first strap-receiving means further includes an actuator aperture defined through an upper portion of said inner hollow tube.

6. The strap mechanism of claim 5 wherein said actuator aperture is defined through another side wall opposite from said one side wall of said inner hollow tube.

7. The strap mechanism of claim 1 wherein said outer hollow tube has pairs of opposite side walls connected with one another along longitudinal edges thereof to define a longitudinal rectangular configuration.

8. The strap mechanism of claim 7 wherein said second strap-receiving means includes a pair of holes defined through one side wall of said outer hollow tube and spaced longitudinally from one another.

9. The strap mechanism of claim 8 wherein said second strap-receiving means further includes an actuator aperture defined through a lower portion of said outer hollow tube.

10. The strap mechanism of claim 9 wherein said actuator aperture is defined through said one side wall of said outer hollow tube.

11. The strap mechanism of claim 9 further comprising:

an actuator hook extendable through said actuator aperture and supported by said lower portion of said outer hollow tube for supporting an object of given weight to be hung therefrom.

12. A self-locking strap mechanism, comprising:
(a) a length of flexible strap;
(b) an elongated inner hollow tube having a first pair of holes defined through a side portion thereof and being spaced longitudinally from one another and receiving said length of flexible strap; and
(c) an elongated outer hollow tube having a second pair of holes defined through a side portion thereof and being spaced longitudinally from one another and receiving said length of flexible strap, said outer hollow tube being inserted over said inner hollow tube, said inner and outer hollow tubes being longitudinally movable relative to one another between locked and released positions wherein said first and second pairs of holes are respectively aligned and misaligned with one another such that portions of said inner and outer hollow tubes defining said holes frictionally grip and release said length of strap routed therethrough.

13. The strap mechanism of claim 12 wherein said inner and outer hollow tubes have respective rectangular cross-sectional configurations.

14. The strap mechanism of claim 12 further comprising:

an actuator aperture defined through an upper portion of said inner hollow tube.

15. The strap mechanism of claim 14 wherein said flexible strap is further routed through said actuator aperture on said upper portion of said inner hollow tube and looped back upon and attached to itself such that said flexible strap is deployable from a stationary point located above said strap mechanism.

16. The strap mechanism of claim 12 further comprising:

an actuator aperture defined through a lower portion of said outer hollow tube.

17. The strap mechanism of claim 12 wherein said inner hollow tube has pairs of opposite side walls connected with one another along longitudinal edges thereof to define a longitudinal rectangular configuration, said pair of holes being defined through one side wall of said inner hollow tube and spaced longitudinally from one another.

18. The strap mechanism of claim 12 wherein said outer hollow tube has pairs of opposite side walls connected with one another along longitudinal edges thereof to define a longitudinal rectangular configuration, said pair of holes being defined through one side wall of said outer hollow tube and spaced longitudinally from one another.

* * * * *